US012125227B2

(12) United States Patent
Zhang

(10) Patent No.: US 12,125,227 B2
(45) Date of Patent: Oct. 22, 2024

(54) DYNAMIC LOG DEPTH COMPRESSION ESTIMATION SYSTEM

(71) Applicant: Adobe Inc., San Jose, CA (US)

(72) Inventor: Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 347 days.

(21) Appl. No.: 17/656,605

(22) Filed: Mar. 25, 2022

(65) Prior Publication Data

US 2023/0306622 A1    Sep. 28, 2023

(51) Int. Cl.
    *G06T 7/593*    (2017.01)
    *G06F 17/11*    (2006.01)
    *G06N 20/00*    (2019.01)
(52) U.S. Cl.
    CPC .............. *G06T 7/593* (2017.01); *G06F 17/11* (2013.01); *G06N 20/00* (2019.01)
(58) Field of Classification Search
    CPC ........... G06T 7/593; G06T 2207/20081; G06T 2207/20084; G06T 7/50; G06F 17/11; G06N 20/00; G06N 3/0464; G06N 3/09; G06N 5/01; G06N 20/10; G06N 20/20
    See application file for complete search history.

(56) References Cited

U.S. PATENT DOCUMENTS

| | | | |
|---|---|---|---|
| 11,238,604 B1 * | 2/2022 | Baig | G06N 20/00 |
| 2019/0180133 A1 * | 6/2019 | Shannon | G06T 5/70 |
| 2019/0385325 A1 * | 12/2019 | Kweon | G06N 3/084 |
| 2021/0004646 A1 * | 1/2021 | Guizilini | G06F 18/2148 |
| 2021/0150278 A1 * | 5/2021 | Dudzik | G06T 7/593 |
| 2021/0174524 A1 * | 6/2021 | Wang | G06N 3/084 |
| 2021/0390339 A1 * | 12/2021 | Ye | G06T 7/50 |
| 2023/0236219 A1 * | 7/2023 | Zhou | G06T 7/50 |
| | | | 382/106 |

OTHER PUBLICATIONS

Depth Prediction From a Single Image With Conditional Adversarial Networks—2017 (Year: 2017).*

(Continued)

*Primary Examiner* — Nizar N Sivji
(74) *Attorney, Agent, or Firm* — Keller Preece PLLC

(57) ABSTRACT

The present disclosure relates to systems, non-transitory computer-readable media, and methods for training and/or implementing machine learning models utilizing compressed log scene measurement maps. For example, the disclosed system generates compressed log scene measurement maps by converting scene measurement maps to compressed log scene measurement maps by applying a logarithmic function. In particular, the disclosed system uses scene measurement distribution metrics from a digital image to determine a base for the logarithmic function. In this way, the compressed log scene measurement maps normalize ranges within a digital image and accurately differentiates between scene elements objects at a variety of depths. Moreover, for training, the disclosed system generates a predicted scene measurement map via a machine learning model and compares the predicted scene measurement map with a compressed log ground truth map. By doing so, the disclosed system trains the machine learning model to generate accurate compressed log depth maps.

20 Claims, 10 Drawing Sheets

(56) References Cited

OTHER PUBLICATIONS

Depth Map Prediction from a Single Image using a Multi-Scale Deep Network—2014 (Year: 2014).*

David Eigen, Christian Puhrsch, and Rob Fergus. Depth map prediction from a single image using a multi-scale deep network. Advances in Neural Information Processing Systems, 27:2366-2374, 2014.

René Ranftl, Alexey Bochkovskiy, and Vladlen Koltun. Vision transformers for dense prediction. In Proceedings of the IEEE/CVF International Conference on Computer Vision, pp. 12179-12188, 2021.

René Ranftl, Katrin Lasinger, David Hafner, Konrad Schindler, and Vladlen Koltun. Towards robust monocular depth estimation: Mixing datasets for zero-shot cross-dataset transfer. IEEE Transactions on Pattern Analysis and Machine Intelligence, 2020.

* cited by examiner

DYNAMIC LOG DEPTH COMPRESSION ESTIMATION SYSTEM

BACKGROUND

Recent years have seen significant improvements in hardware and software platforms for digital image processing and editing. For example, conventional systems often use artificial intelligence models to determine single image depth estimations from input digital images. To illustrate, conventional systems utilize various models to estimate depth maps that reflect distances within a scene portrayed by pixels of digital images. Conventional systems utilize these depth maps for a variety of downstream image manipulation tasks. Although conventional depth estimation systems utilize artificial intelligence models to make depth estimations, such systems have a number of problems in relation to accuracy, efficiency, and flexibility of operation.

BRIEF SUMMARY

Embodiments of the present disclosure provide benefits and/or solve one or more of the foregoing or other problems in the art with systems, non-transitory computer-readable media, and methods that train and/or implement machine learning models utilizing compressed log scene measurement maps (e.g., compressed log depth maps or compressed log height maps). For example, the disclosed systems generate compressed log scene depth maps by converting depth maps to disparity maps and applying a logarithmic function. In particular, the disclosed systems extract distance distribution metrics from a digital image (e.g., distance mean and standard deviation metrics) and determine a base for the logarithmic function utilizing the distance distribution metrics. By applying a logarithmic function (with a base value determined specifically for the depth distribution metrics from the digital image) the disclosed systems generate compressed log scene depth maps that accurately differentiate objects portrayed at a variety of different depths.

In one or more implementations, the disclosed systems utilize this conversion process to train and/or implement more accurate, efficient, and flexible machine learning models. For example, the disclosed systems generate a predicted depth map by using a depth prediction machine learning model and compare the predicted depth map to a compressed log ground truth depth map. By comparing the predicted depth map with the compressed log ground truth depth map, the disclosed systems train the machine learning model to generate accurate compressed log depth maps. Moreover, utilizing machine learning models trained in this manner, the disclosed systems generate more accurate depth maps that improve a variety of downstream tasks for generating modified digital images (e.g., blurring background elements in a digital image).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
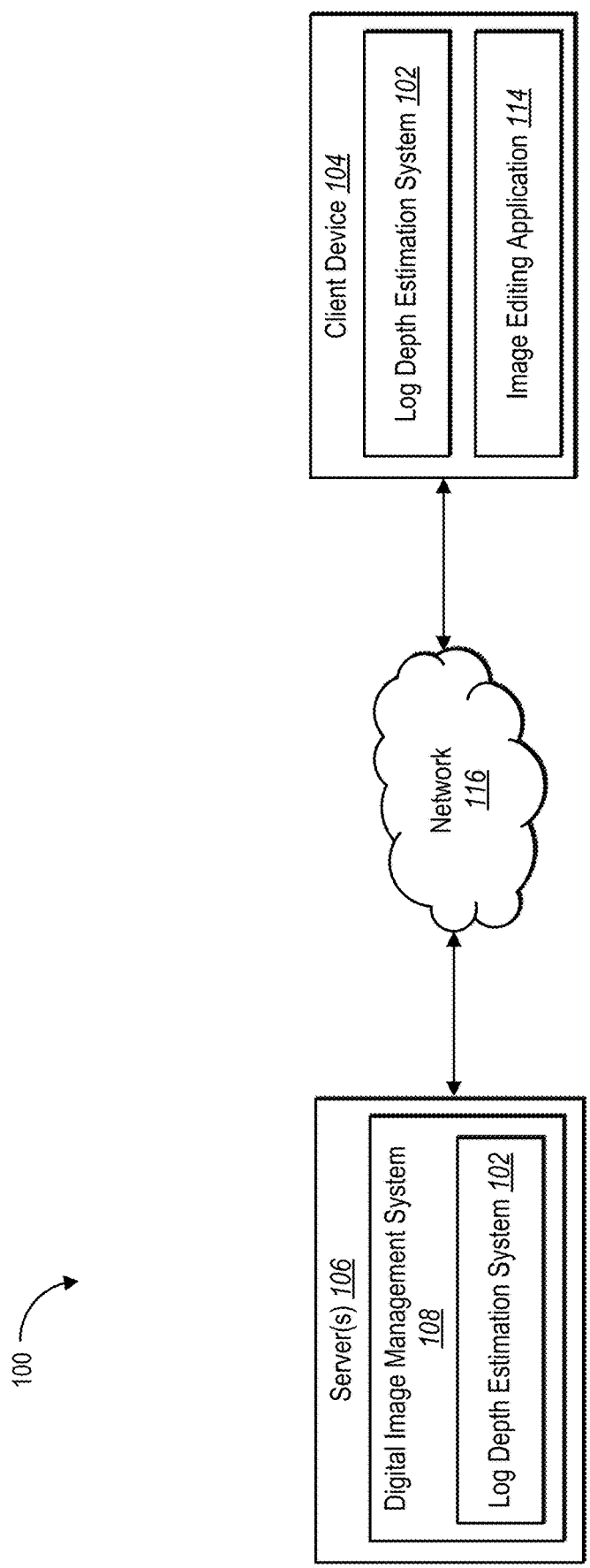
FIG. 1 illustrates a diagram of an environment in which a log depth estimation system operates in accordance with one or more embodiments.

This disclosure describes one or more embodiments of a log depth estimation system that trains and/or implements machine learning models utilizing compressed log scene measurement maps (e.g., compressed log depth maps and/or compressed log height maps). For example, the log depth estimation system trains a depth prediction machine learning model with compressed log ground truth depth maps. To illustrate, the log depth estimation system compares predicted depth maps with compressed log ground truth depth maps in modifying/learning parameters of the depth prediction machine learning model. Depth prediction machine learning models trained on the compressed log ground truth depth maps provides a more consistent separation of regions at the far end of a scene in a digital image.

In addition to training the depth prediction machine learning model utilizing compressed log depth maps, the log depth estimation system also utilizes trained machine learning models to generate compressed log depth maps for digital images. For example, for a new input digital image, the log depth estimation system utilizes a depth prediction machine learning model to generate a compressed log depth map. In one or more embodiments, the log depth estimation system converts the compressed log ground truth depth map to a depth map to support downstream applications such as lens blur or novel view synthesis. Moreover, as mentioned above, in addition to depth maps, in some embodiments the log depth estimation system also generates a variety of other scene measurement maps such as height maps.

As discussed above, in training depth prediction machine learning models, the log depth estimation system generates the log ground truth depth map from the ground truth depth map. For example, the log depth estimation system generates the compressed log ground truth depth map by converting the ground truth depth map to a disparity map. In particular, the log depth estimation system converts the ground truth depth map to a disparity map by applying an inverse function to the ground truth depth map.

As mentioned, in one or more embodiments the log depth estimation system generates the compressed log ground truth depth map based on one or more distance distribution metrics. For example, distance distribution metrics includes depth distribution metrics and disparity distribution metrics. Furthermore, in one or more example embodiments, the log depth estimation system determines one or more distance distribution metrics from the disparity map. In particular, the log depth estimation system determines an average distance metric (e.g., a mean disparity value of the disparity map) or a distance deviation metric (e.g., a standard deviation of disparity values in the disparity map). In some embodiments, the log depth estimation system determines the one or more distance distribution metrics and uses them in a logarithmic function to generate the compressed log ground truth depth map.

Furthermore, as just discussed, in one or more implementations the log depth estimation system utilizes the one or more distance distribution metrics to determine a log base. For example, the log depth estimation system combines the average distance metric and the distance deviation metric to determine the logarithmic base. In particular, the log depth estimation system uses a log base that includes a ratio of the average distance metric and the distance deviation metric. Accordingly, in one or more implementations the log depth estimation system uses distance distribution metrics to scale and shift the ground truth scene measurement map.

As discussed above, the log depth estimation system modifies parameters of the depth prediction machine learning model. For example, the log depth estimation system compares the compressed log ground truth depth map with the predicted depth map. In particular, the log depth estimation system applies a loss function to determine a measure of loss and modifies parameters of the depth prediction machine learning model based on the determined measure of loss.

Moreover, once trained, the log depth estimation system utilizes the depth prediction machine learning model to generate predicted depth maps for digital images. In particular, the log depth estimation system generates a compressed log depth map from an input digital image and then converts the compressed log depth map to a depth map. For example, the log depth estimation system utilizes an exponential function to convert a compressed log depth map into a disparity map and then utilizes an inverse function to generate a depth map from the disparity map. Moreover, in one or more implementations the log depth estimation system utilizes the depth map to generate a modified digital image from the initial digital image.

As mentioned above, conventional systems suffer from a number of technical deficiencies with regard to accuracy, efficiency, and flexibility of implementing computing devices. For example, conventional systems often fail to generate accurate depth estimations. To illustrate, conventional systems often generate depth maps that fail to reflect important depth structure information in a digital image. For example, because ranges of depth often vary dramatically from image to image, depth maps in conventional systems struggle to meaningfully distinguish between close up objects in an image.

Some conventional systems seek to counter issues with depth maps by using disparity maps. However, the use of disparity maps also suffers from retaining important depth structure information. This is due to disparity maps struggling to differentiate between regions at the far end of a scene. Specifically, areas such as skylines in conventional systems are not efficiently detected when using disparity maps.

In addition to these inaccuracy problems, conventional systems are also inefficient. For example, in training artificial intelligence models, conventional systems utilize ground truth depth maps. However, because these depth maps often fail to precisely delineate between objects (e.g., multiple up-close objects), conventional models take significant time and computing resources to train. In addition, because of the inaccuracies discussed above, conventional systems also suffer from inefficiencies in a variety of downstream tasks that utilize depth maps. Indeed, conventional systems require significant time and computing resources to correct depth maps and/or correct errors from utilizing inaccurate depth maps.

To illustrate, due to conventional systems' inaccurate estimations on depth, client devices employing background blurring tools in an image editing application typically need to apply additional touch up features to compensate for the inefficiencies of conventional systems. Specifically, client devices may need to employ a variety of tools such as new layers, erasers, or setting adjustments to accurately fix the initial depth estimations made by conventional systems. Client devices also often request duplicate implementation of artificial intelligence models to re-estimate depth of a digital image in response to inaccurate estimations. This further contributes to additional computational processing burdens and inefficiencies.

In addition, conventional systems also suffer from inflexibility of operation. For example, conventional systems inflexibly generate depth and disparity maps with ranges that fail to retain important depth structure information. As mentioned above, the depth of images varies drastically from image to image. Accordingly, conventional systems, often only operate properly with regard to digital images with limited/proscribed depth ranges.

The log depth estimation system provides many advantages and benefits over conventional systems and methods. For example, by utilizing compressed log scene measurement maps in training and implementing machine learning models, the log depth estimation system improves accuracy relative to conventional systems. To illustrate, the log depth estimation system retains important depth structure information in a digital image by training depth prediction machine learning models with compressed log ground truth depth map and utilizing depth prediction machine learning models to generate compressed log depth maps. Indeed, in one or more implementations the log depth estimation system converts the depth of a digital image to a log-depth space with a dynamic log base which provides a depth estimation more consistent with a human perception of distance. In one or more embodiments, the log depth estimation system scales and shifts the ground truth depth map based on distribution metrics within the disparity map (e.g., the inverse of the depth map) to portray depth more accurately at a variety of distances within a scene.

In one or more implementations, the log depth estimation system also improves efficiency relative to conventional systems. For example, by utilizing compressed log depth maps in training, the log depth estimation system more efficiently teaches machine learning models to delineate between objects at varying distances (e.g., multiple close-up objects in a scene with other far-off objects). Accordingly, in one or more implementations, the log depth estimation system reduces the time and computer resources needed to train depth prediction machine learning models. Furthermore, because one or more implementations of the log depth estimation system improve accuracy of depth prediction machine learning models, the log depth estimation also generates improved depth maps and improves efficiency of downstream tasks that utilize depth maps. For example, in one or more embodiments the log depth estimation system reduces time and resources utilized by conventional systems to correct depth maps or correct artifacts in digital images generated utilizing inaccurate depth maps.

In one or more embodiments, the log depth estimation system also improves flexibility relative to conventional systems. Indeed, in one or more implementations, the log depth estimation system generates a compressed log ground truth depth map based on distance distribution metrics unique to each digital image. For example, the log depth estimation system generates a dynamic base for a log-depth function such that a resulting compressed log depth map has a normalized range that covers the most salient depth information structures of the scene within the digital image. The log depth estimation system utilizes depth prediction machine learning model trained based on the compressed log ground truth depth map to make more accurate depth estimations across a variety of digital images having a variety of depth ranges.

Additional detail will now be provided in relation to illustrative figures portraying example embodiments and implementations of a log depth estimation system 102. For example, FIG. 1 illustrates a system environment (or "environment") 100 for implementing the log depth estimation system 102 in accordance with one or more embodiments. As shown in FIG. 1, the environment 100 includes server(s) 106, a digital image management system 108, a client device 104, a network 116, and an image editing application 114. Each of the components of the environment 100 communicate (or are at least configured to communicate) via the network 116. Example networks are discussed in additional detail below in relation to FIG. 9.

As further illustrated in FIG. 1, the environment 100 includes the server(s) 106. In some embodiments, the server(s) 106 comprises a content server and/or a data collection server. Additionally, or alternatively, the server(s) 106 comprise an application server, a communication server, a web-hosting server, a social networking server, or a digital content management server.

Moreover, as shown in FIG. 1, the server(s) 106 implements the digital image management system 108. In one or more embodiments, the digital image management system 108 generates, receives, edits, manages, and/or stores digital images or other digital content (e.g., digital video). For example, in some instances, the digital image management system 108 accesses one or more digital images and transmits the one or more digital images to the log depth estimation system 102 and/or the client device 104. In other instances, the digital image management system 108 receives generated digital images for transmitting in one or more formats via the network 116, storing in cloud storage hosted on the server(s) 106, etc.

In one or more embodiments, the log depth estimation system 102 efficiently and accurately prepares training data, trains depth prediction machine learning models, and generates modified digital images. To do so, in one or more embodiments, the log depth estimation system 102 generates predicted depth maps for a digital image utilizing a depth prediction machine learning model and trains the depth prediction machine learning model with a compressed log ground truth depth map. In particular embodiments, the log depth estimation system 102 uses distance distribution metrics of a ground truth depth map to generate the compressed log ground truth depth map. Based on comparing the results of the predicted depth map with the compressed log ground truth depth map, the log depth estimation system 102 modifies parameters of the depth prediction machine learning model (as will be explained below in relation to subsequent figures).

As shown in FIG. 1, the environment 100 includes the client device 104. The client device 104 can include one of a variety of computing devices, including a smartphone, tablet, smart television, desktop computer, laptop computer, virtual reality device, augmented reality device, or other computing device as described in relation to FIG. 9. Although FIG. 1 illustrates a single client device 104, in some embodiments the environment 100 includes multiple client devices 104 (e.g., multiple mobile computing devices connected to each other via the network 116). Further, in some embodiments, the client device 104 receives user input (e.g., to add text, shapes, images, etc.) and provides via the image editing application 114 information pertaining to accessing, viewing, modifying, generating, enhancing, and/or interacting with a digital image to the server(s) 106.

Moreover, as shown, the client device 104 optionally implements all or a part of the log depth estimation system 102. In particular embodiments, the log depth estimation system 102 on the client device 104 comprises a web application, a native application installed on the client device 104 (e.g., a mobile application, a desktop application, a plug-in application, etc.), or a cloud-based application where part of the functionality is performed by the server(s) 106. In some embodiments, the log depth estimation system 102 on the client device 104 presents or displays information to a user associated with the client device 104, including additional digital images. Furthermore, in one or more embodiments, the log depth estimation system 102 on the client device 104 captures digital images via a camera and utilizes the digital images (e.g., to determine depth maps and/or modify the digital images).

In additional or alternative embodiments, the log depth estimation system 102 on the client device 104 represents and/or provides the same or similar functionality as described herein in connection with the log depth estimation system 102 on the server(s) 106. In some implementations, the log depth estimation system 102 on the server(s) 106 supports the log depth estimation system 102 on the client device 104.

For example, in some embodiments, the server(s) 106 train one or more machine-learning models described herein. The log depth estimation system 102 on the server(s) 106 provides the one or more trained machine-learning models to the log depth estimation system 102 on the client device 104 for implementation. In other words, the client device 104 obtains (e.g., downloads) the log depth estimation system 102 from the server(s) 106. At this point, the client device 104 may utilize the log depth estimation system 102 to generate additional digital images with variations by performing the operations described herein independently from the server(s) 106.

In some embodiments, the log depth estimation system 102 includes a web hosting application that allows the client device 104 to interact with content and services hosted on the server (s) 106. To illustrate, in one or more implementations, the client device 104 accesses a web page or computing application supported by the server(s) 106. The client device 104 provides input to the server(s) 106 (e.g., a digital image). In response, the log depth estimation system 102 on the server(s) 106 performs operations described herein (e.g., utilizing one or more machine learning models) to generate log scene measurement maps and/or modified digital images. The server(s) 106 then provides the output or results of the operations (e.g., a depth map and/or modified digital image) to the client device 104.

In some embodiments, though not illustrated in FIG. 1, the environment 100 has a different arrangement of components and/or has a different number or set of components altogether. For example, in certain embodiments, the client device 104 communicates directly with the server(s) 106, bypassing the network 116. As another example, the environment 100 includes a third-party server comprising a content server and/or a data collection server.

As discussed above, the log depth estimation system 102 improves conventional systems by retaining important depth structure information. For example, FIG. 2A illustrates a variety of different digital images and corresponding maps, including a digital image 200, a depth map 202, a disparity map 204, and a compressed log depth map 206.

Figure 2A:
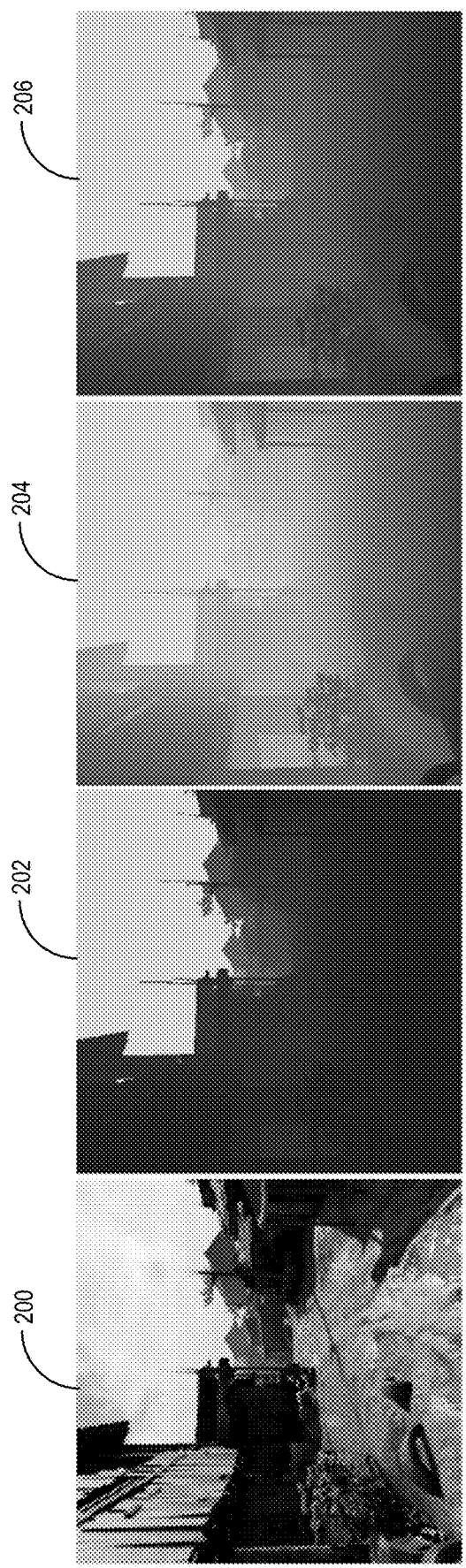
FIG. 2A illustrates an example digital image, depth map, disparity map, and compressed log depth map.

For instance, FIG. 2A illustrates a digital image 200. In some embodiments, the log depth estimation system 102 captures the digital image 200 utilizing a camera device or access the digital image 200 from a repository of digital images (e.g., a camera roll). As shown, the digital image 200 illustrates far scene elements and close scene elements. Thus, the digital image 200 comprises pixels of various colors (e.g., RGB values) portraying a scene.

For its part, the depth map 202 illustrates a digital representation of distances portrayed in a digital image. In particular, the depth map 202 includes a depth range for a single image derived from parameters of a depth prediction machine learning model. Moreover, the depth map 202 represents a plurality of machine learning predictions for pixel values within a digital image. In particular, FIG. 2A illustrates the depth map 202 as truncated at the mean depth value of the original depth map. As shown in FIG. 2A, the range of the depth map 202 is dominated by the far end of the scene (e.g., the sky region) while the close end of the scene has poor separation.

Additionally, FIG. 2 illustrates a disparity map 204. In one or more implementations, the disparity map 204 includes a digital representation of apparent pixel differences. For example, the disparity map 204 includes disparity values reflecting perceived differences or distances for a point/pixel from the perspective of two different viewpoints (e.g., perceived difference for a pixel between two eyes or two cameras). FIG. 2A illustrates, the disparity map 204 showing an inverse representation of the depth map 202. The disparity map 204 shows poor separation (as compared to the depth map 202) between the far end scene elements. In comparing the depth map 202 with the disparity map 204, the depth map 202 is better for far scene elements while the disparity map 204 is better for close scene elements.

Moreover, FIG. 2A illustrates a compressed log depth map 206. In one or more implementations, as discussed above, the log depth estimation system 102 uses the compressed log depth map 206 because it retains important depth structure information better than the depth map 202 or the disparity map 204. In particular, the compressed log depth map 206 results from the log depth estimation system 102 applying a logarithmic function (e.g., to the depth map 202 or disparity map 204). To illustrate, based on distribution metrics within the depth map 202 or disparity map 204, the log depth estimation system 102 scales and shifts the depth map 202 or disparity map 204 to form the compressed log depth map 206.

As mentioned above, the depth map 202 retains far scene elements of the digital image 200 better than disparity maps while the disparity map 204 retains close scene elements of the digital image 200 better than depth maps. The compressed log depth map 206 retains both far scene elements and close scene elements of the digital image 200 better than both the depth map 202 and disparity map 204. As such the log depth estimation system 102 utilizes the compressed log depth map 206 because it retains important depth structure information better and provides for more accuracy, efficiency and flexibility in training and downstream applications that involve depth structure information.

Figure 2B:
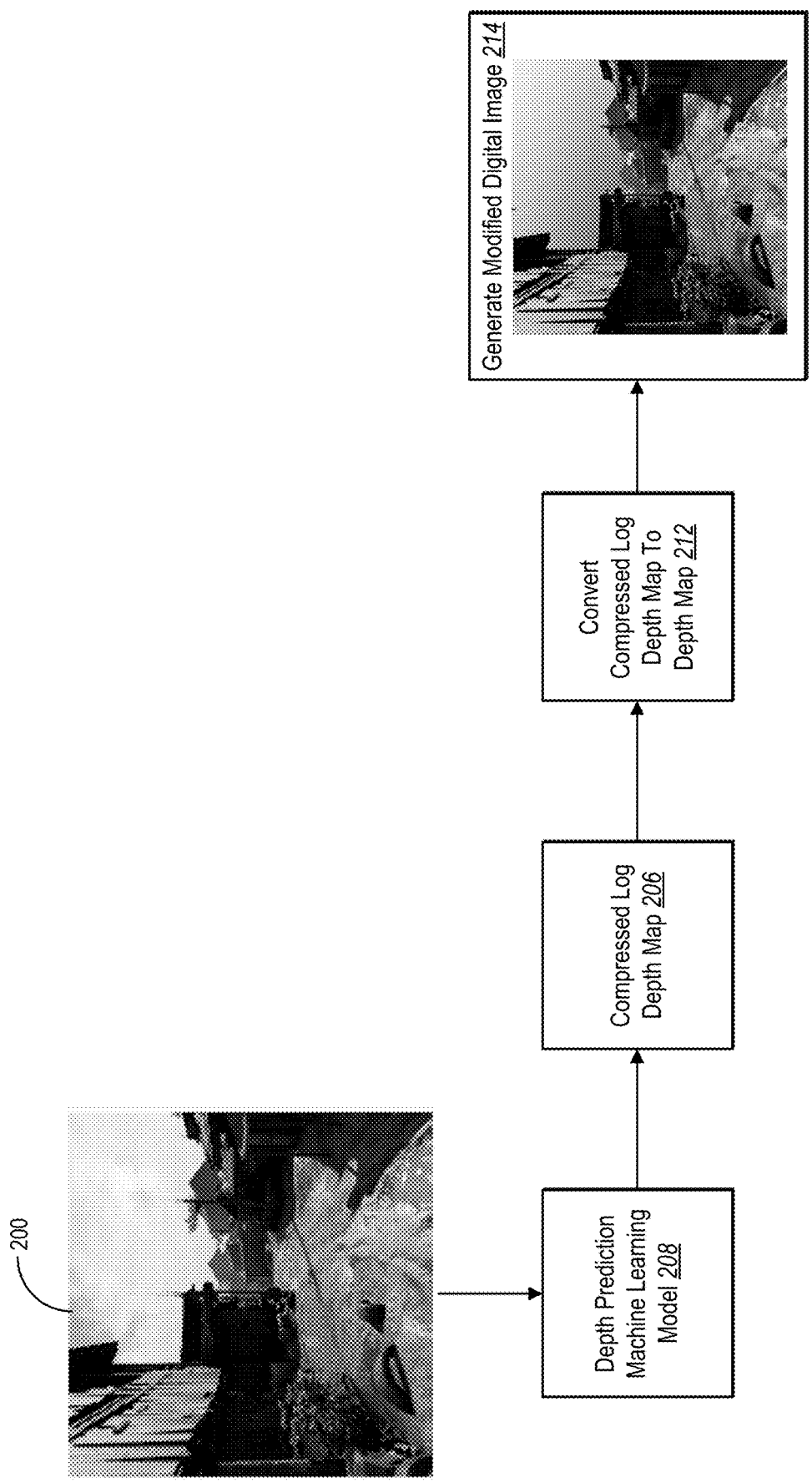
FIG. 2B illustrates a block diagram of the log depth estimation system generating a modified digital image in accordance with one or more embodiments.

As discussed above, in one or more embodiments the log depth estimation system 102 generates a modified digital image utilizing a compressed log scene measurement map. For example, FIG. 2B illustrate the log depth estimation system 102 generating a modified digital image 214 from the compressed log depth map 206 in accordance with one or more embodiments. For instance, FIG. 2B illustrates the log depth estimation system 102 receiving the digital image 200. The log depth estimation system 102 can receive or access the digital image 200 from a variety of sources. For example, the digital image 200 includes an RGB image captured via a camera of a client device, accessed from storage of a client device, or received from a cloud repository of digital images.

As shown in FIG. 2B, the log depth estimation system 102 utilizes a depth prediction machine learning model 208 to generate the compressed log depth map 206 from the digital image 200. The log depth estimation system 102 can utilize a variety of machine learning models to analyze pixel data of the digital image 200. In one or more implementations, the depth prediction machine learning model 208 is a neural network, such as a convolutional neural network. Accordingly, the log depth estimation system 102 feeds pixel data of the digital image 200 to input channels of the neural network. The neural network then utilizes learned parameters within one or more layers to generate a predicted depth estimation. In other implementations the log depth estimation system 102 utilizes a neural network, a decision tree (such as a random forest model or a boosted gradient decision tree), or other machine learning model to process pixel data of the digital image 200.

As illustrated, upon receiving the digital image 200, the log depth estimation system 102 utilizes the depth prediction machine learning model 208 to generate the compressed log depth map 206. In particular, the log depth estimation system 102 utilizes the depth prediction machine learning model 208 specifically trained to generate compressed log depth maps to analyze the pixels of the digital image 200 and determines a pixel value corresponding to depth estimation. For example, the log depth estimation system 102 encodes pixel data of the digital image 200 (e.g., using one hot encoding, an encoding layer, or a vector mapping) and then processes the encoding utilizing the depth prediction machine learning model 208. More details regarding training the depth prediction machine learning model 208 to generate compressed log depth maps will be provided below in FIG. 5.

As illustrated in FIG. 2A and as later illustrated in FIG. 6, because the log depth estimation system 102 retains important depth information of digital images, the client device can make enhanced modifications to digital images. Indeed, the log depth estimation system 102 performs an act 212 of converting the compressed log depth map 206 to a depth map. In particular, the log depth estimation system 102 converts the compressed log depth map to a diversity map.

For example, the log depth estimation system 102 applies an exponential function to the compressed log depth map 206. When applying the exponential function, the log depth estimation system 102 determines the exponent of the exponential function from the training data used for training the depth prediction machine learning model 208. To illustrate, the log depth estimation system 102 empirically establishes the average base from the training data as the exponent value for the exponential function. To further illustrate, in one or more example embodiments, the empirical exponent value is set to 1.5. Accordingly, an exponential function with an exponent of 1.5 in one or more example embodiments is applied to the compressed log depth map 206 to convert it to a diversity map.

In one or more embodiments, the log depth estimation system 102 further converts the diversity map to a depth map. For example, the log depth estimation system 102 applies an inverse function to generate depth map from the diversity map. Moreover, the log depth estimation system 102 utilizes the depth map for further downstream uses such as generating modified digital image 214.

As just mentioned, the log depth estimation system 102 uses the depth map (the one converted from the compressed log depth map 206) for downstream applications. In particular, the client device of the image editing application generates a modified digital image based on the digital image 200 from the depth map. As shown in FIG. 2B, this includes blurring the background of the digital image 200. In one or more implementations, converting the compressed log depth map 206 to the depth map provides downstream applications in the image editing application such as neural filters, depth blur filters, landscape mixer filter, content-aware fille, lens blur, and novel view synthesis. As discussed above, these downstream applications of the depth map provides for enhanced digital images and more efficient, flexible, and accurate editing tools.

As outlined above, the compressed log depth map 206 provides improved flexibility, accuracy, and efficiency for digital images with large depth ranges, but it also maintains the quality of images with small depth ranges. The log depth estimation system 102 does not experience degradation for small depth ranges due to the compressed log depth map 206 utilizing distribution metrics to adjust to different types of image depth ranges (this is further illustrated in FIG. 3).

Although FIG. 2B illustrates the act 212, the log depth estimation system 102 generates the modified digital image 214 in a variety of methods. In one or more implementations, the log depth estimation system 102 does not perform the act 212 of converting the compressed log depth map to a depth map. In particular, the log depth estimation system 102 utilizes the compressed log depth map 206 to generate the modified digital image 214. To illustrate, the client device (e.g., client device 104 as discussed in FIG. 1) receives the compressed log depth map 206 with an option for further modifying a digital image.

Figure 3:
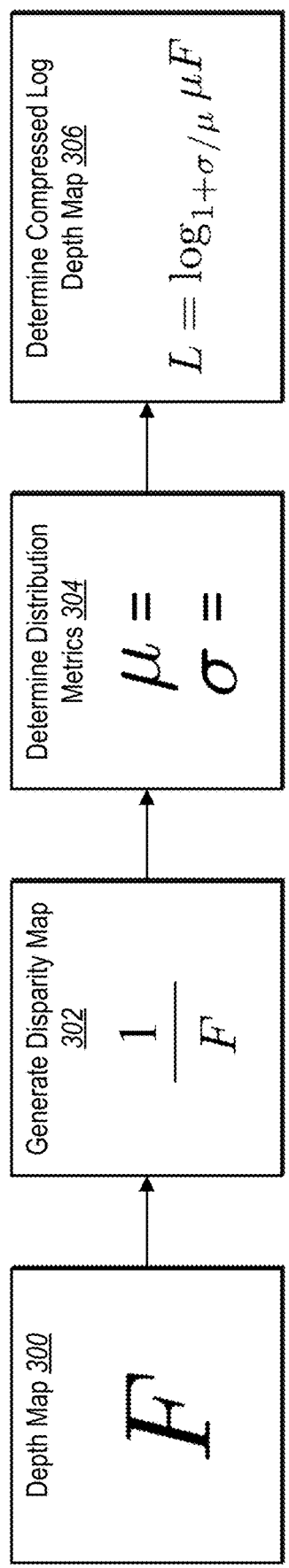
FIG. 3 illustrates a block diagram of the log depth estimation system generating a disparity map from a depth map in accordance with one or more embodiments.

As discussed above, in one or more implementations the log depth estimation system 102 generates a compressed log depth map from a depth map (or vice versa). In particular, the log depth estimation system can convert between depth maps and compressed log depth maps utilizing inverse functions (e.g., to generate a disparity map) and a logarithmic or exponential function. For instance, the log depth estimation system 102 scales and shifts a depth map corresponding to a digital image. Specifically, FIG. 3 illustrates the log depth estimation system 102 converting a depth map 300 to a compressed log depth map in accordance with one or more embodiments.

In particular the log depth estimation system 102 first converts the depth map 300 to a disparity map 302. For example, FIG. 3 illustrates applying a function to the depth map 300 to generate the disparity map 302. In particular, FIG. 3 illustrates applying an inverse function to the depth map 300. To illustrate, FIG. 3 represents the depth map 300 with F and applies the inverse function to the depth map 300, such that 1/F represents the disparity map 302. To further illustrate, the log depth estimation system 102 utilizes pixel values of the depth map 300 and applies the pixel values within a function. In particular, the log depth estimation system 102 takes the inverse pixel values of the depth map 300 to generate the disparity map 302.

As discussed above, the log depth estimation system 102 uses distance distribution metrics 304 to generate the compressed log depth map 306. In particular, the log depth estimation system determines distance distribution metrics 304 for the depth map 300 (e.g., from disparity values of the disparity map 302). The log depth estimation system 102 can utilize a variety of metrics for the distance distribution metrics 304. For example, in one or more embodiments, the log depth estimation system determines as illustrated in FIG. 3, a mean distance metric and/or a deviation distance metric.

The mean distance metric can include a measure reflecting an average of depth, disparity, or other forms of distance representation for a digital image. For example, the mean distance metric can include a variety of measures, such as a mean, median, mode, or a weighted average. In addition, the deviation distance metric can also include a measure reflecting a variation in depth, disparity, or other forms of distance representation. For example, the deviation distance metric can include a difference, deviation, or distribution of pixel depths (e.g., a dispersion, standard deviation, average absolute deviation, medium absolute deviation, or maximum absolute deviation).

As just mentioned, the log depth estimation system 102 determines the compressed log depth map 306 utilizing the distribution metrics 304. In one or more implementations, the log depth estimation system 102 utilizes a function based on the distribution metrics corresponding to the digital image to generate a compressed log depth map based on the function. In particular, the log depth estimation system 102 utilizes distribution metrics 304 from the disparity map 302 in a function to generate the compressed log depth map 306.

In one or more implementations, the log depth estimation system 102 utilizes the distribution metrics 304 as the base of a logarithmic function to generate the compressed log depth map 306. In particular, the log depth estimation system 102 combines distribution metrics 304 to determine the logarithmic base (e.g., by multiplying, adding, subtracting, averaging, or taking a ratio of the distribution metrics 304). To illustrate, FIG. 3 shows utilizing a ratio of the distribution metrics to determine the logarithmic base.

In addition to the log depth estimation system 102 utilizing the distribution metrics 304 to determine the logarithmic base, in one or more implementations, the log depth estimation system 102 utilizes the distribution metrics 304 as arguments or operands. In particular, the log depth estimation system 102 takes distribution metrics deemed relevant to use as arguments of a logarithmic function in generating the compressed log depth map 306. To illustrate, the log depth estimation system 102 utilizes the mean distance metric as an argument in determining the compressed log depth map 306. To further illustrate, the log depth estimation system 102 determines the compressed log depth map 306 (L) via the following equation:

$$L = \log_{1+\sigma/\mu} \mu F$$

As shown in the above equation, the compressed log depth map 306 (L) is equivalent to a logarithmic function. In particular, the logarithmic base of the logarithmic function is based on a ratio of the disparity deviation metric to the mean disparity plus the whole number 1. Furthermore, the operand in the above logarithmic function includes the mean disparity multiplied by the value of the depth map 300. To further illustrate, for generating the compressed log depth map 306 (L) from the disparity map 302 (D), pixels on the disparity map 302 that have the value of μ have a compressed log value of $\log_{1+\sigma/\mu} 1 = 0$. Accordingly, pixel values around the mean disparity of the digital image equal zero.

Additionally, for pixels on the disparity map 302 with a value of σ+μ, the compressed log value of $$\log_{1+\sigma/\mu} \frac{\mu}{\mu + \sigma} = -1.$$

In this case, pixel values with one standard deviation above the mean disparity equal −1. To elaborate, because of this relationship, the majority of the disparity map 302 pixel values are centered at 0 in the compressed log depth map 306. As previously discussed, this formulation of the compressed log depth map 306 centered at the mean disparity value, i.e., 0, provides for compression of the depth range to a reasonable range scale of −1 to +1. As mentioned however, the log depth estimation system 102 can utilize a variety of formulations that result in a variety of range scales (e.g., 0 to 1, −10 to 10, or 0 to 100).

As also discussed previously, the formulation for the compressed log depth map 306 can also be represented as scaling and shifting. For example, in one or more example embodiments the log depth estimation system 102 scales and shifts the depth map 300. Alternatively, the log depth estimation system 102 first applies an inverse function to the depth map 300 to generate the disparity map 302 and then generates the compressed log depth map 306 by scaling and shifting the disparity map 302. In particular, scaling and shifting includes utilizing the one or more distribution metrics 304 discussed above. To illustrate, the scaling and shifting represents utilizing the mean distance and distance deviation metric to generate a base that scales the logarithmic function to the appropriate range. Whereas shifting occurs by utilizing the distribution metrics 304 such as the mean distance to fix a range around 0 (as mentioned in the above paragraph). To further illustrate, the logarithmic formulation discussed above ($L = \log_{1+\sigma/\mu} \mu F$) can also be represented by:

$$L = \frac{\log F}{\log(1 + \sigma/\mu)} + \log_{1+\sigma/\mu} \mu$$

Furthermore, as mentioned above, in some implementations the log depth estimation system 102 establishes maximum and minimum thresholds for generating a compressed log depth map. For instance, FIG. 4, illustrates an act 412 of generating compressed log depth map thresholds.

Figure 4:
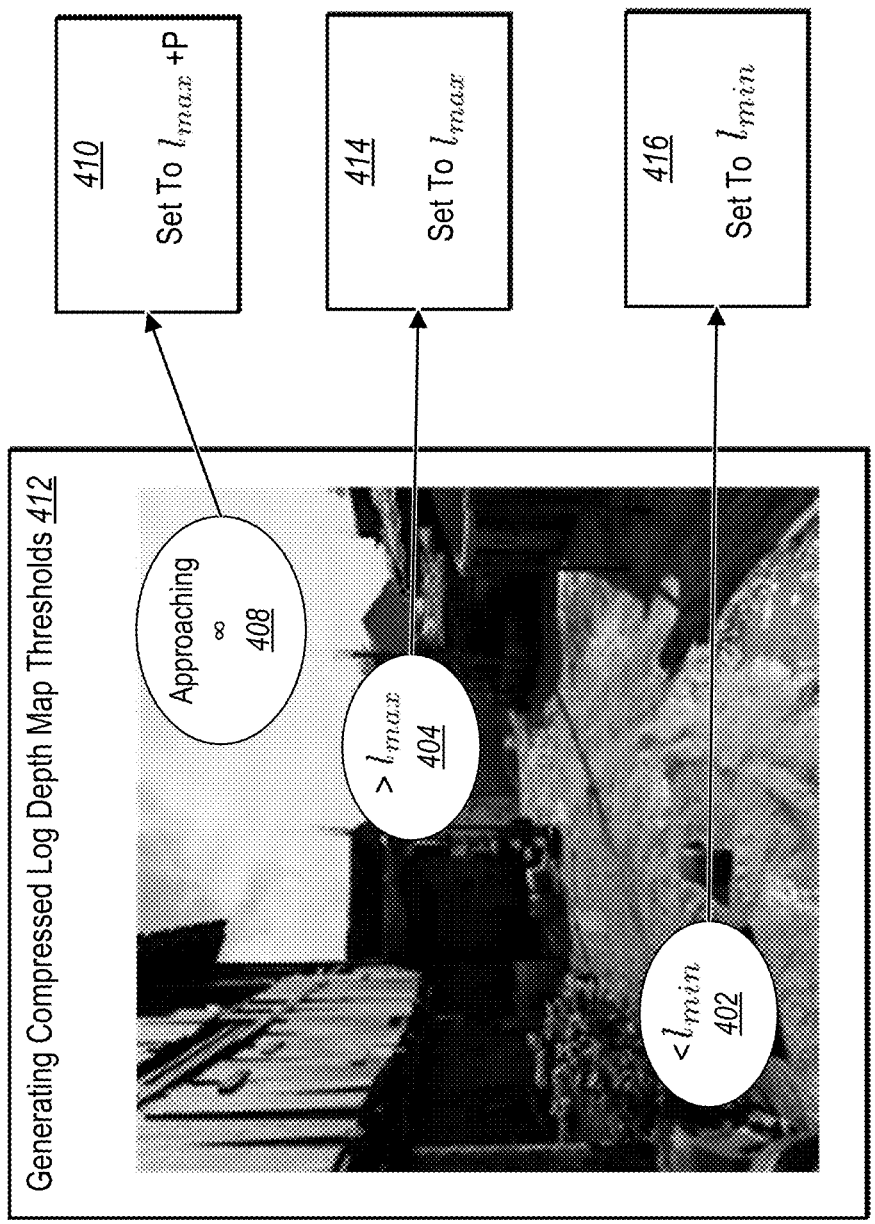
FIG. 4 illustrates an example diagram of the log depth estimation system determining thresholds of the compressed log ground truth depth map in accordance with one or more embodiments.

Specifically, FIG. 4 shows setting $l_{max}$ and $l_{min}$ thresholds for different regions of a digital image. In one or more implementations, the log depth estimation system 102 determines thresholds of the compressed log depth map. In particular, the log depth estimation system 102 determines minimum thresholds for the compressed log depth map. To illustrate, as just described with regard to FIG. 3, the log depth estimation system 102 receives a digital image, generates a depth map, generates a disparity map (by applying an inverse function), and generates the compressed log depth map from distribution metrics of the disparity map. Furthermore, the log depth estimation system 102 identifies pixel values within the compressed log depth map that are at or below a predetermined pixel value.

In one or more implementations, the log depth estimation system 102 identifies pixel values at or below a predetermined pixel value to establish the minimum threshold. In particular, the log depth estimation system 102 compresses maps by clipping the range at a minimum threshold. To illustrate, the log depth estimation system 102 determines a minimum threshold and any pixel value less than the minimum threshold is set to the minimum threshold.

As discussed above, the log depth estimation system 102 also sets maximum thresholds. In one or more implementations, the log depth estimation system 102 uses a maximum threshold for the compressed log depth map. In particular, the log depth estimation system 102 identifies pixel values within the aforementioned compressed log depth map that are at or above a predetermined pixel value.

Furthermore, the log depth estimation system 102 in some example embodiments has a cut-off value above the predetermined pixel value. As such, the log depth estimation system 102 excludes pixel values that exceed the predetermined pixel value by a large margin (this is discussed in more detail below with regards to approaching infinity). To illustrate, the log depth estimation system 102 compresses the compressed log depth map by clipping the range at a maximum threshold. To illustrate, the log depth estimation system 102 determines a maximum threshold and pixel values greater than the maximum threshold is set to the maximum threshold.

As mentioned above, the log depth estimation system 102 identifies pixel values within a digital image to establish thresholds. In one or more implementations, as similarly described above, the log depth estimation system identifies all the pixel values within the compressed log depth map. In particular, the log depth estimation system 102 determines whether the pixel values are below the minimum threshold, at the minimum threshold, at the maximum threshold, above the maximum threshold, or approaching infinity. To illustrate, in response to determining the pixel values, the log depth estimation system performs an act of setting the pixel value to a predetermined threshold.

As illustrated, FIG. 4 shows the compressed log depth map where a closer scene element 402 is less than the minimum threshold (e.g., <$l_{min}$). As such, the log depth estimation system 102 performs an act 416 of setting the pixel values less than the minimum threshold to the minimum threshold (<$l_{min}$ set to $l_{min}$). For farther scene elements 404 that are greater than the maximum threshold (e.g., >$l_{max}$), the log depth estimation system 102 performs an act 414 of setting the pixel values to the maximum threshold (>$l_{max}$ set to $l_{max}$).

The log depth estimation system 102 can determine the maximum and minimum thresholds based on a variety of factors. In some embodiments, the log depth estimation system 102 determines these thresholds based on user input, based on historical depth ranges (e.g., analysis of maximum or minimum depths of historical images), and/or based on the depth ranges corresponding to a particular digital image (e.g., the bottom or top percentile of depths).

As mentioned above, in some embodiments, the log depth estimation system 102 determines a pixel depth value that far exceeds the maximum threshold (e.g., that exceeds the maximum threshold by an additional threshold). In some implementations, the pixel values that far exceed the maximum threshold are not set to the maximum threshold. To illustrate, for pixel values approaching infinity 408 (e.g., an additional threshold beyond the maximum threshold or a certain depth metric above a cluster of other depth values in the digital image), the log depth estimation system 102 performs an act 410 of setting the pixel values to the maximum threshold plus a margin (e.g., $l_{max}+\rho$). The pixel values approaching infinity 408 typically include the sky region of a digital image. The margin added to the maximum threshold represents the margin between the far end (e.g., the sky) and the rest of the scene. In particular, the margin includes a value determined based on empirical test data and a value based on the depth prediction machine learning model. To illustrate, the log depth estimation system 102 stores the margin value (p) for the compressed log depth map. In response to identifying and determining pixel values approaching infinity 408, the log depth estimation system 102 utilizes the stored margin value ρ by performing the act 410 of setting the threshold to $l_{max}+\rho$.

As discussed above, pixel values approaching infinity are not set to the maximum threshold, but the maximum threshold plus a margin. In one or more implementations, as just mentioned, the log depth estimation system 102 determines the sky region to separate it from the rest of the scene in the digital image. This ensures that the log depth estimation system 102 does not fail to distinguish between pixel values approaching infinity 408 and pixel values >$l_{max}$. In particular, the log depth estimation system 102 determines the sky region in a digital image by utilizing training data of the depth prediction machine learning model (e.g., depth prediction machine learning model 208 as discussed in FIG. 2B; as mentioned above, the actual training of the depth prediction machine learning model is discussed in FIG. 5). To illustrate, the log depth estimation system 102 identifies black regions where the log depth estimation system 102 receives little to no signal and photosynthetic data. Accordingly, the log depth estimation system 102 considers pixel points that return little to no signal as approaching infinity 408.

As mentioned above, the log depth estimation system utilizes pixel data to clip regions of the compressed log depth map for establishing thresholds. For example, the log depth estimation system 102 via the depth prediction machine learning model determines signals that include the sky regions/regions approaching infinity 408 and utilizes that to perform the act 412 of generating compressed log depth map thresholds. In particular, the depth prediction machine learning model detects sky regions/regions approaching infinity 408 based on the aforementioned principles. To illustrate, determining the sky region/approaching infinity 408 results in the log depth estimation system 102 having a higher contrast between the sky and the mountains in a digital image.

Figure 5:
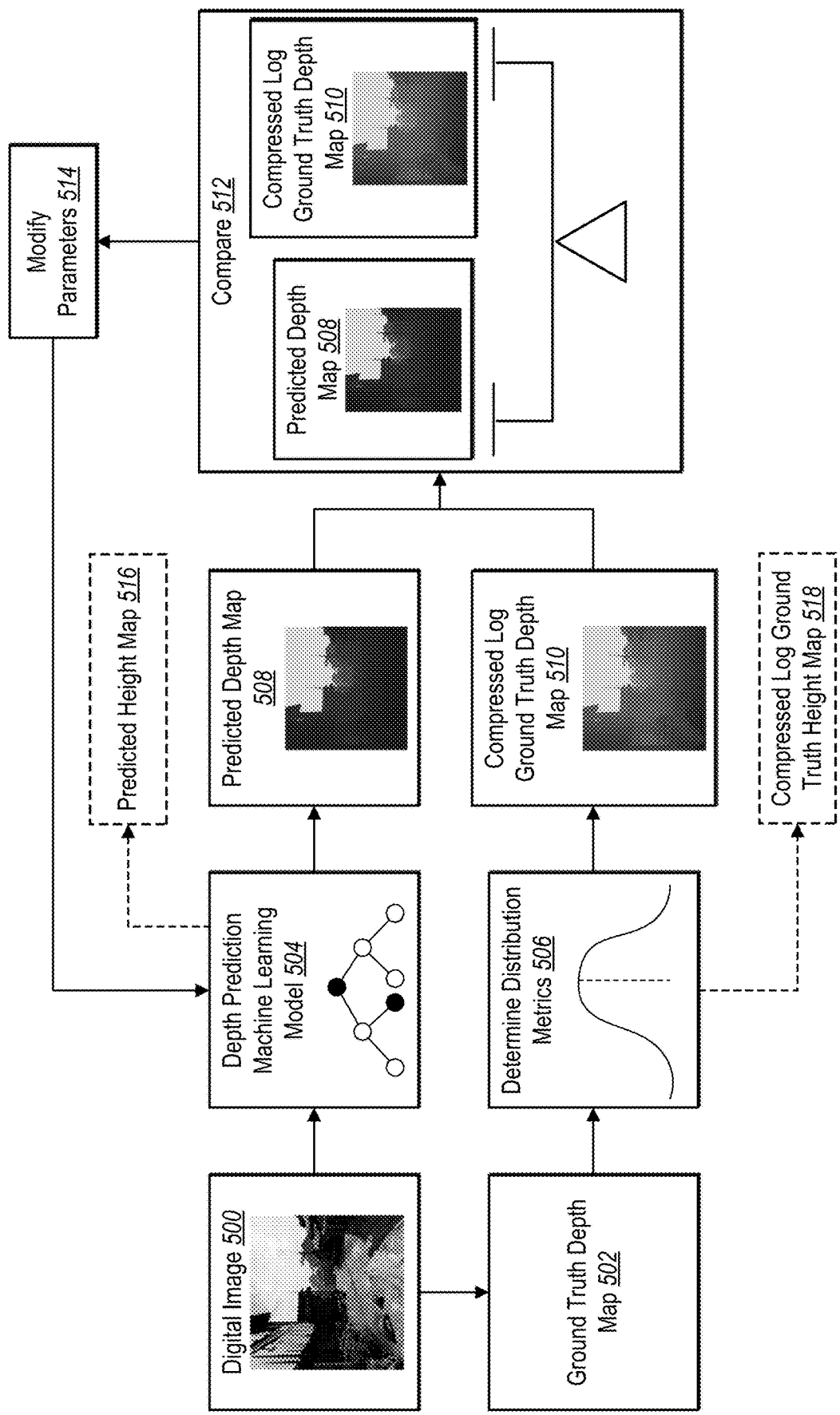
FIG. 5 illustrates a block diagram of the log depth estimation system modifying parameters of a depth prediction machine learning model in accordance with one or more embodiments.

As mentioned above, in one or more embodiments, the log depth estimation system 102 trains a depth prediction machine learning model. For instance, FIG. 5 illustrates modifying parameters 514 based on an act 512 of comparing a predicted depth map 508 and a compressed log ground truth depth map 510. Specifically, FIG. 5 illustrates the log depth estimation system 102 receiving a digital image 500.

In one or more example embodiments, the log depth estimation system 102 receives the digital image 500 as part of a repository of digital images for training a machine learning model. In particular, the log depth estimation system 102, utilizes many digital images with different depth ranges to improve the predictions of the machine learning model. To illustrate, the log depth estimation system 102 utilizes digital images with a large gap between the close scene elements and the far scene elements as well as digital images with very small ranges.

As discussed above, the log depth estimation system 102 utilizes a depth prediction machine learning model 504 to generate the predicted depth map 508 from the digital image 500. For example, the log depth estimation system 102 receives the digital image 500 and utilizes the depth prediction machine learning model 504 to make an estimation of pixel values within the digital image 500. In particular, the predicted depth map 508 represents a spatial representation of the distance of different scene elements within the digital image 500 predicted by the depth prediction machine learning model 504.

As just mentioned, the log depth estimation system 102 trains the depth prediction machine learning model 504. In one or more implementations the log depth estimation system 102 receives the digital image 500 via the depth prediction machine learning model 504. For example, the log depth estimation system 102 uses the depth prediction machine learning model 504 for generating depth prediction estimations. In particular, depth prediction machine learning model 504 refers to a computer algorithm or a collection of computer algorithms that can be trained and/or tuned based on inputs to approximate unknown functions. For example, the depth prediction machine learning model 504 can include a computer algorithm with branches, weights, or parameters that changed based on training data to improve for a particular task. Thus, a depth prediction machine learning model 504 can utilize one or more learning techniques to improve in accuracy and/or effectiveness. Example depth prediction machine learning models 504 include various types of decision trees, support vector machines, Bayesian networks, linear regressions, logistic regressions, random forest models, or neural networks (e.g., deep neural networks).

To illustrate, in one or more embodiments, the log depth estimation system 102 utilizes a deep neural network architecture as described by David Eigen, Christian Puhrsch, and Rob Fergus in Depth map prediction from a single image using a multi-scale deep network, Advances in Neural Information Processing Systems 27:2366-2374 (2014), which is incorporated in its entirety herein by reference. The log depth estimation system 102 can utilize a variety of depth prediction models and architectures.

As mentioned, the log depth estimation system 102 trains the depth prediction machine learning model 504 via utilizing a ground truth depth map 502. For example, the log depth estimation system 102 generates or identifies the ground truth depth map 502 corresponding to the digital image 500. In particular ground truth depth map 502 refers to a known observation or result corresponding to depth of a digital image. To illustrate, ground truth depth map 502 includes a known distance of a pixel value which the depth prediction estimation system utilizes to modify its depth predictions. In one or more implementations the log depth estimation system trains the depth prediction machine learning model 504 by converting the ground truth depth map 502 to a compressed log ground truth depth map 510.

As just discussed, the log depth estimation system 102 utilizes the compressed log ground truth depth map 510 for training the depth prediction machine learning model 504. Specifically, the log depth estimation system 102 determines and utilizes the distribution metrics 506 as discussed above FIGS. 2, 3, and 4. In particular, the log depth estimation system 102 determines distribution metrics 506 of the ground truth depth map 502 such as an average distance metric and a distance deviation metric. Based on these determined distribution metrics 506, the log depth estimation system 102 shifts and scales the ground truth depth map 502 to generate the compressed log ground truth depth map 510. As such the log depth estimation system 102 utilizes the compressed log depth map as a ground truth map for comparison with the predicted depth map 508.

As mentioned above, the log depth estimation system 102 performs the act 512 of comparing the compressed log ground truth depth map 510 with the predicted depth map 508. For example, the log depth estimation system 102 identifies pixel depth values within the predicted depth map 508 and the compressed log ground truth depth map 510. In particular, the log depth estimation system identifies a pixel depth value in the predicted depth map 508 and identifies the corresponding pixel depth value in the compressed log ground truth depth map 510. Furthermore, to illustrate, the log depth estimation system 102 compares the pixel depth value against the corresponding compressed log ground truth depth map 510 pixel value and determines whether the pixel depth values are greater than, less than, or equal to each other.

As discussed, the log depth estimation system 102 modifies parameters 514 of the depth prediction machine learning model 504 based on the aforementioned comparison. For example, the log depth estimation system 102 determines a measure of loss between the predicted depth map 508 and the compressed log ground truth depth map 510. To illustrate, the log depth estimation system 102 utilizes a loss function to determine the measure of loss. To further illustrate, the log depth estimation system 102 loss functions include mean absolute error loss (L1), quadratic loss (L2), cross entropy loss, and Kullback-Leibler loss.

As mentioned, the log depth estimation system 102 trains the depth prediction machine learning model 504 based on applying a loss function to the predicted depth map 508 and the compressed log ground truth depth map 510. For example, the log depth estimation system 102 can modify internal weights or parameters of a neural network (e.g., via back propagation) to reduce the measure of loss. Similarly, the log depth estimation system 102 can modify nodes of a decision tree model (e.g., a random forest model) based on the measure of loss from the loss function. The log depth estimation system 102 can iteratively perform the process illustrated in FIG. 5 to train the depth prediction machine learning model 504 to generate compressed log depth maps.

As shown by the dotted lines in FIG. 5, the log depth estimation system 102 can also generate other scene measurement maps. Although FIGS. 2A-5 illustrate the use of depth maps and compressed log depth maps, the log depth estimation system 102 can also operate with regard to other scene measurement estimations (e.g., scene measurement maps and compressed log scene measurement maps). In particular, "scene measurement" includes one or more distances portrayed in a digital image. In particular, a scene measurement map includes depth or height distance measurements for digital images. In one or more implementations, height maps include surface elevation values of the pixels within a digital image. Accordingly, although many of the example embodiments described herein refer to depth and depth maps, the log depth estimation system 102 can also train and utilize scene measurement machine learning models to generate other compressed log scene measurement maps (e.g., compressed log height maps).

For example, the log depth estimation system 102 can train a scene measurement machine learning model (e.g., height machine learning model) to generate a predicted scene measurement map (predicted height map), compare the predicted scene measurement map to compressed log ground truth scene measurement maps (e.g., compressed log ground truth height maps) to train the scene measurement machine learning model. To illustrate, rather than the aforementioned depth maps, the log depth estimation system 102 uses a height prediction machine learning model, a ground truth height map, a predicted height map 516, a compressed log ground truth height map 518, compares the height maps, and modifies parameters of the height prediction machine learning model.

As discussed above, the log depth estimation system 102 provides for higher quality, efficiency, flexibility, and accuracy for depth estimations. For instance, as shown in FIG. 6, conventional methods show a drop off in quality as compared to the log depth estimation system 102 in terms of distinguishing between close scene elements and distinguishing between far scene elements. For example, FIG. 6 shows two digital images with disparity maps, compressed log depth maps, and conventional depth maps. In particular, FIG. 6 illustrates a comparison between the different maps and the extent at which log depth estimation system 102 retains important depth structure information in the compressed log depth maps.

Figure 6:
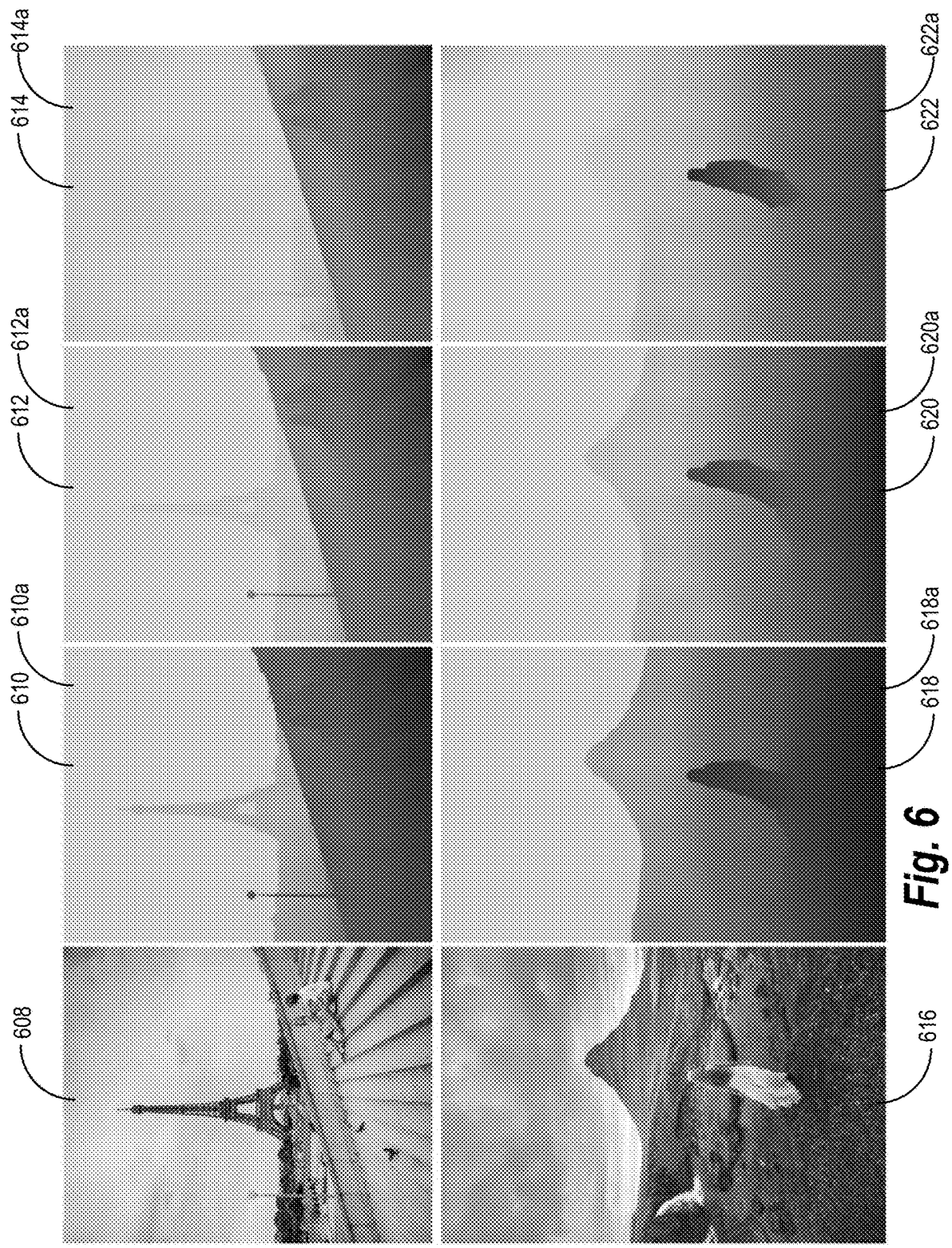
FIG. 6 illustrates an example diagram of different scene measurement maps in accordance with one or more embodiments.

Specifically, FIG. 6 illustrates a first digital image 608 and a second digital image 616. The first digital image 608 and the second digital image 616 both portray far scene elements and close scene elements. To illustrate, the first digital image 608 portrays the Eiffel tower as a far element, with the sky beyond the Eiffel tower and closer scene elements such as the stairs and two humans and birds on the stairs. To further illustrate, the second digital image 616 portrays a mountain peak with the sky beyond the mountain and close scene elements with a human.

FIG. 6 further illustrates a conventional map generated by conventional methods. As mentioned previously, conventional methods can utilize artificial intelligence models to make depth estimations based on depth maps. In particular, the first conventional method 614a and second conventional method 622a generates a first conventional map 614 and a second conventional map 622. To illustrate, the first conventional map 614 and the second conventional map 622 show maps with depth information of the first digital image 608 and the second digital image 616. Furthermore, the second conventional map 622 shows the outline of the human in the second digital image 616 but poorly delineates the mountain in the far end of the scene. Likewise, in the first conventional map 614, the humans sitting on the stairs are slightly visible, while the Eiffel tower is very poorly delineated. Accordingly, as illustrated in FIG. 6, the first conventional method 614a and second conventional method 622a suffer from a lack of clarity between far scene elements. As such, in the conventional maps, the clearest depth information are the human figures.

FIG. 6 also illustrates generating disparity maps. For example, FIG. 6 shows a first disparity map 612 and a second disparity map 620 generated from a first method 612a and a second method 620a. The first disparity map 612 and the second disparity map 620 from the log depth estimation system 102 displays a much higher contrast for differentiating between far scene elements such as the sky and the Eiffel tower in the first digital image 608 and the mountains and the sky in the second digital image 616. In direct comparison between the first disparity map 612 and the first conventional map 614, the far scene elements have a much clearer separation as do the stairs in the close scene elements. Likewise, the second disparity map 620 compared with the second conventional map 622 also has a much clearer separation in the far scene elements as well as the close scene elements.

Moreover, FIG. 6 also illustrates generating compressed log depth maps. For example, FIG. 6 shows a first compressed log depth map 610 and a second compressed log depth map 618 generated from a first method 610a and a second method 618a (example embodiments of the log depth estimation system 102). As shown, these example embodiments of the log depth estimation system 102 display an even higher contrast for differentiating between scene elements in the compressed log depth maps. To illustrate, the first compressed log depth map 610 and the second compressed log depth map 618 show clear separation between the Eiffel tower and the skyline as well as clear separation between the mountain and the skyline as compared to the other maps. Furthermore, the first and second compressed log depth maps 610 and 618, as compared to the other maps, also show clear delineation between the close scene elements.

Figure 7:
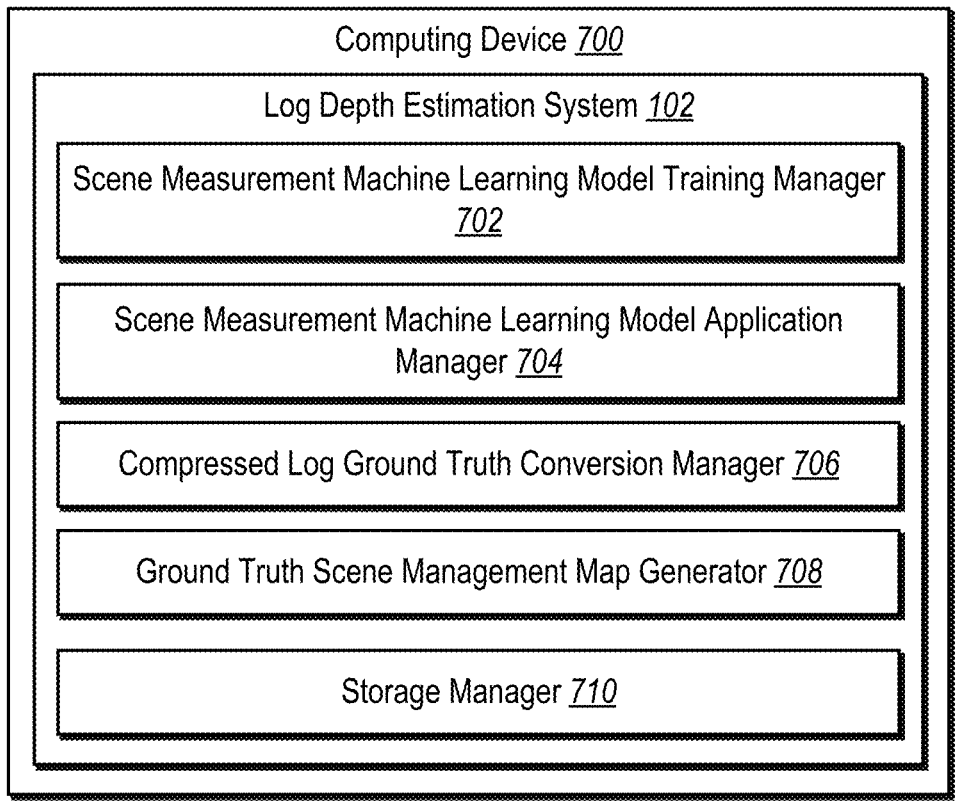
FIG. 7 illustrates a schematic diagram of an example architecture of the log depth estimation system in accordance with one or more embodiments.

Referring now to FIG. 7, additional detail is provided regarding the capabilities and components of the log depth estimation system 102 in accordance with one or more implementations. In particular, FIG. 7 shows a schematic diagram of an example architecture of the log depth estimation system 102 implemented executed on a computing device 700 (e.g., the server(s) 106 and/or the client device 104 implementing the log depth estimation system 102 in accordance with one or more embodiments of the present disclosure). Also illustrated, the log depth estimation system 102 includes a scene measurement machine learning model training manager 702, a scene measurement machine learning model application manager 704, a compressed log ground truth conversion manager 706, a ground truth scene measurement map generator 708, and a storage manager 710.

The scene measurement machine learning model training manager 702 trains, modifies, adjusts, and changes parameters associated with machine learning models to generate compressed log scene measurement maps. For example, the scene measurement machine learning model training manager 702 can receive comparison data relating to pixel distances of ground truth maps and predicted maps to determine a measure of loss and modify parameters of machine learning models to learn to generate accurate compressed log depth maps.

The scene measurement machine learning model application manager 704 generates maps related to scene measurement from digital images. For example, the scene measurement machine learning model application manager 704 can receive a digital image and generate maps that predict depth information of the digital image. In particular, the scene measurement machine learning model application manager 704 can generate predicted compressed log depth maps.

The compressed log ground truth conversion manager 706 generates compressed log maps from other maps. For example, the compressed log ground truth conversion manager 706 receives scene measurement map and generates the compressed log maps based on distribution metrics associated with the scene measurement map.

The ground truth scene measurement map generator 708 generates ground truth maps used to further train the scene measurement prediction machine learning models. For example, the ground truth scene measurement map generator 708 can generate ground truth scene measurement maps such as ground truth depth maps, ground truth disparity maps, ground truth compressed log depth maps, and ground truth height maps.

The storage manager 710 can include one or more memory devices for storing information related to the log depth estimation system 102. For instance, the storage manager 710 can store, recall, and/or maintain digital images, depth maps, disparity maps, compressed log depth maps, machine learning models, or other scene measurement maps.

Each of the components of the log depth estimation system 102 optionally includes software, hardware, or both. For example, the components optionally include one or more instructions stored on a computer-readable storage medium and executable by processors of one or more computing devices, such as a client device (e.g., a mobile client device) or server device. When executed by the one or more processors, the computer-executable instructions of the log depth estimation system 102 causes a computing device to perform the methods described herein. Alternatively, the components optionally include hardware, such as a special-purpose processing device to perform a certain function or group of functions. In addition, the components of the log depth estimation system 102 optionally includes a combination of computer-executable instructions and hardware.

Furthermore, the components of the log depth estimation system 102 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications software packages. The foregoing are either registered trademarks or trademarks of Adobe Inc. in the United States and/or other countries.

Figure 8:
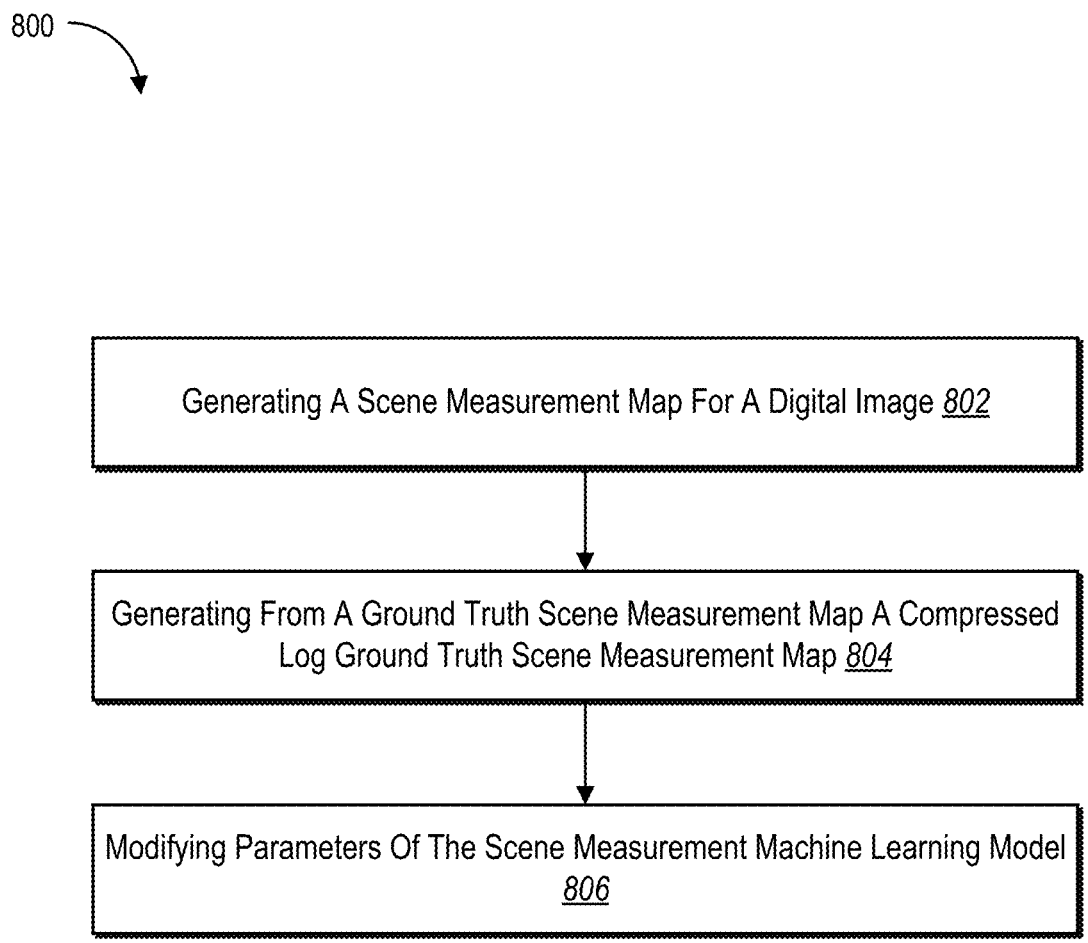
FIG. 8 illustrates an example series of acts for modifying parameters of a depth prediction machine learning model in the log depth estimation system.

FIGS. 1-7, the corresponding text, and the examples provide a number of different methods, systems, devices, and non-transitory computer-readable media of the log depth estimation system 102. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for modifying parameters of a depth prediction machine learning model. The series of acts 800 includes an act 802 of generating a depth map for a predicted image. For example, this includes generating a predicted depth map for a digital image utilizing a depth prediction machine learning model. Additionally, this includes a system including at least one processor and at least one non-transitory computer-readable storage medium storing instructions that when executed by the at least one processor, configured to cause the system to generate a predicted scene measurement map for a digital image utilizing a scene measurement prediction machine learning model. In particular, the act 802 also includes at least one processor, configured to cause the system to generate the predicted scene measurement map by generating a predicted height map. Furthermore, the act 802 includes at least one processor, configured to cause the system to generate the predicted scene measurement map by generating a predicted depth map.

The series of acts 800 also includes an act 804 of generating from a ground truth depth map a compressed log ground truth depth map. For example, this includes generating from a ground truth depth map of the digital image a compressed log ground truth depth map based on one or more depth distribution metrics of the ground truth depth map. Additionally, this includes a system including at least one processor and at least one non-transitory computer-readable storage medium storing instructions that when executed by the at least one processor, configured to cause the system to generate from a ground truth scene measurement map of the digital image a compressed log ground truth scene measurement map based on one or more distribution metrics corresponding to the ground truth scene measurement map. In particular, the act 804 includes converting the ground truth depth map to a disparity map, determining the one or more distance distribution metrics from the disparity map, and converting the disparity map to the compressed log ground truth depth map utilizing the one or more distance distribution metrics from the disparity map. In addition, the act 804 includes utilizing a logarithmic function based on a mean distance metric and deviation distance metric to generate the compressed log ground truth depth map.

Additionally, the act 804 includes utilizing the one or more distance distribution metrics to determine a log base for a logarithmic function and utilizing the logarithmic function with the determined log base to generate the compressed log ground truth depth map from the ground truth depth map. Furthermore, the act 804 includes determining a minimum threshold of the compressed log ground truth depth map corresponding with the digital image and determining a maximum threshold of the compressed log ground truth depth map corresponding with the digital image. The act 804 also includes at least one processor, configured to cause the system to generate the compressed log ground truth scene measurement map by generating a compressed log ground truth depth map from a ground truth depth map.

Further, the act 804 includes converting the ground truth depth map to a disparity map utilizing an inverse function and generating a compressed log ground truth depth map from the disparity map based on the one or more distribution metrics. The act 804 also includes determining one or more distance distribution metrics from the disparity map and converting the disparity map to the compressed log ground truth depth map utilizing the one or more distance distribution metrics from the disparity map. The act 804 includes at least one processor, configured to cause the system to generate the compressed log ground truth scene measurement map from the ground truth scene measurement map utilizing a logarithmic function based on a mean distance metric and deviation distance metric.

Additionally, the act 804 includes at least one processor, configured to cause the system to generate the compressed log ground truth scene measurement map by scaling and shifting the ground truth scene measurement map based on a mean distance metric and deviation distance metric of the ground truth scene measurement map. Moreover, the act 804 includes determining a log base for a logarithmic function utilizing one or more scene measurement distribution metrics and generating the compressed log ground truth scene measurement map from the ground truth scene measurement map utilizing the logarithmic function with the log base.

The series of acts 800 also includes an act 806 of modifying parameters of a scene measurement machine learning model. For example, the act 806 includes modifying parameters of the depth prediction machine learning model by comparing the predicted depth map and the compressed log ground truth depth map. Additionally, this includes a system including at least one processor and at least one non-transitory computer-readable storage medium storing instructions that when executed by the at least one processor, configured to cause the system to modify parameters of the scene measurement prediction machine learning model by comparing the predicted scene measurement map and the compressed log ground truth scene measurement map. In particular, the act 806 includes determining, a measure of loss by comparing the compressed log ground truth depth map with the predicted depth map via a loss function and modifying the parameters of the depth prediction machine learning model based on the determined measure of loss.

Furthermore, the act 806 includes generating a second predicted depth map for a second digital image utilizing the depth prediction machine learning model, generating from a second ground truth depth map of the second digital image a second compressed log ground truth depth map based on one or more distance distribution metrics of the second ground truth depth map and modifying parameters of the depth prediction machine learning model by comparing the second predicted depth map and the second compressed log ground truth depth map. Additionally, the act 806 includes determining, a measure of loss by comparing the compressed log ground truth scene measurement map with the predicted scene measurement map via a loss function and modifying the parameters of the scene measurement prediction machine learning model based on the determined measure of loss.

While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As another example of an additional act not shown in FIG. 8, act(s) in the series of acts 800 may also include generating a compressed log depth map. For example, this includes generating a compressed log depth map from a digital image utilizing a depth prediction machine learning model. Further this includes converting the compressed log depth map to a depth map. For example, this includes converting the compressed log depth map to a depth map utilizing an exponential function. Additionally, this includes converting the compressed log depth map to a disparity map utilizing the exponential function and converting the disparity map to the depth map utilizing an inverse function. This also includes determining an exponent for the exponential function based on one or more distance distribution metrics of one or more digital images. Moreover, this includes generating a modified digital image from the digital image. For example, this includes generating a modified digital image from the digital image utilizing the depth map.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
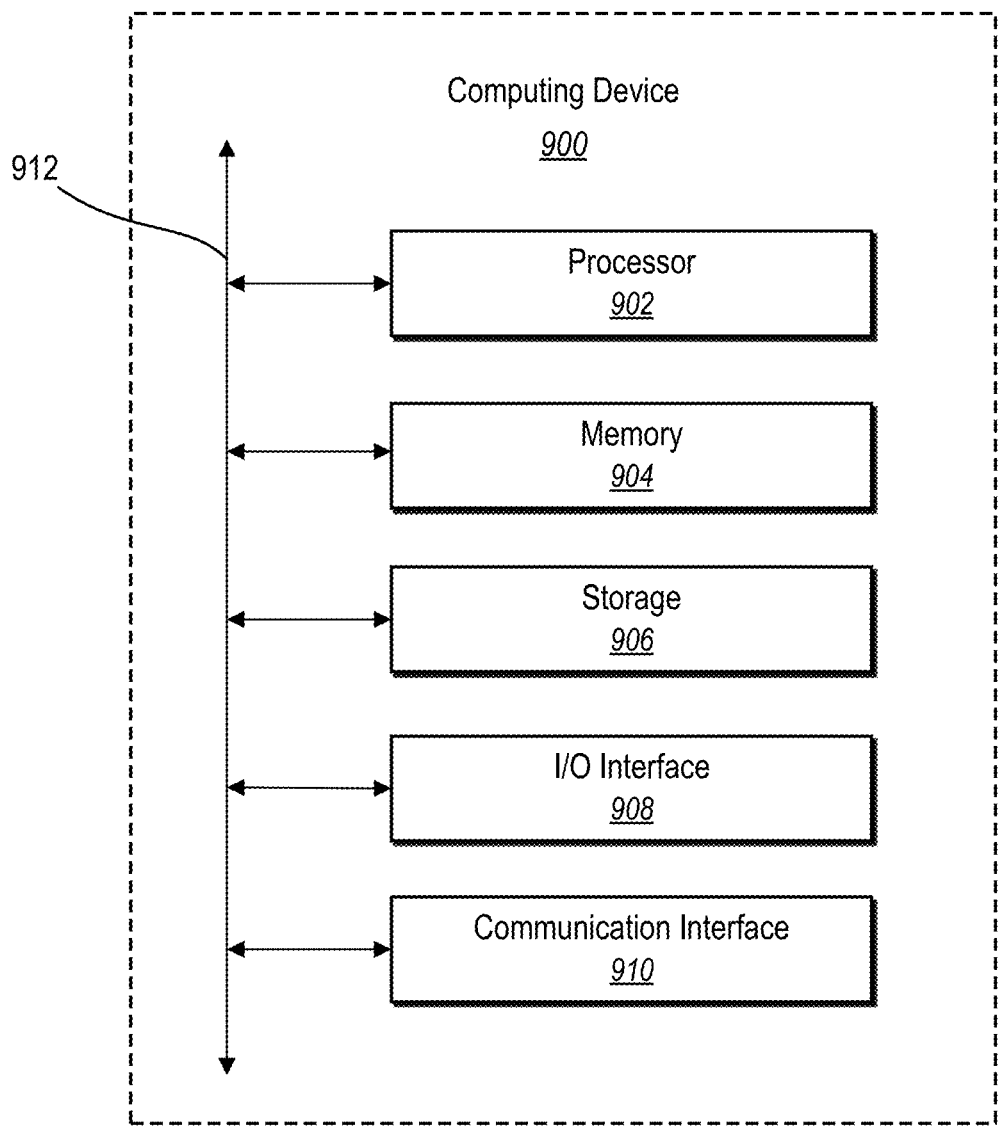
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., computing device 600, server device 106 and client devices 104). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders.

Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause the at least one processor to perform operations comprising:
    generating a predicted depth map for a digital image utilizing a depth prediction machine learning model;
    generating a disparity map from a ground truth depth map of the digital image;
    generating from the disparity map a compressed log ground truth depth map based on one or more distance distribution metrics of the ground truth depth map; and
    modifying parameters of the depth prediction machine learning model by comparing the predicted depth map and the compressed log ground truth depth map.

2. The non-transitory computer-readable medium of claim 1, wherein generating the compressed log ground truth depth map from the ground truth depth map further comprises:
    determining the one or more distance distribution metrics from the disparity map; and
    converting the disparity map to the compressed log ground truth depth map utilizing the one or more distance distribution metrics from the disparity map.

3. The non-transitory computer-readable medium of claim 1, wherein generating the compressed log ground truth depth map comprises utilizing a logarithmic function based on a mean disparity metric and deviation disparity metric to generate the compressed log ground truth depth map.

4. The non-transitory computer-readable medium of claim 1, wherein:
generating the predicted depth map comprises providing far scene learning elements for the depth prediction machine learning model; and
generating the disparity map comprises providing close scene learning elements for the depth prediction machine learning model.

5. The non-transitory computer-readable medium of claim 1, wherein generating the compressed log ground truth depth map further comprises:
utilizing the one or more distance distribution metrics to determine a log base for a logarithmic function; and
utilizing the logarithmic function with the determined log base to generate the compressed log ground truth depth map from the ground truth depth map.

6. The non-transitory computer-readable medium of claim 1, wherein modifying parameters of the depth prediction machine learning model comprises:
determining, a measure of loss by comparing the compressed log ground truth depth map with the predicted depth map via a loss function; and
modifying the parameters of the depth prediction machine learning model based on the determined measure of loss.

7. The non-transitory computer-readable medium of claim 1, wherein generating the compressed log ground truth depth map further comprises:
determining a minimum threshold of the compressed log ground truth depth map corresponding with the digital image; and
determining a maximum threshold of the compressed log ground truth depth map corresponding with the digital image.

8. The non-transitory computer-readable medium of claim 1, further comprises:
generating a second predicted depth map for a second digital image utilizing the depth prediction machine learning model;
generating from a second ground truth depth map of the second digital image a second compressed log ground truth depth map based on one or more distance distribution metrics of the second ground truth depth map; and
modifying parameters of the depth prediction machine learning model by comparing the second predicted depth map and the second compressed log ground truth depth map.

9. A system comprising:
at least one processor; and
at least one memory device coupled to the at least one processor that causes the system to:
generate a predicted depth map or a predicted scene measurement map for a digital image utilizing a scene measurement prediction machine learning model;
generate a disparity map from a ground truth scene measurement map of the digital image;
generate from the disparity map a compressed log ground truth scene measurement map based on one or more distribution metrics corresponding to the ground truth scene measurement map; and
modify parameters of the scene measurement prediction machine learning model by comparing the predicted depth map or the predicted scene measurement map with the compressed log ground truth scene measurement map.

10. The system of claim 9, wherein the at least one processor further causes the system to generate the predicted scene measurement map by generating a predicted height map.

11. The system of claim 9, wherein the at least one processor further causes the system to:
generate the predicted scene measurement map by generating the predicted depth map; and
generate the compressed log ground truth scene measurement map by generating a compressed log ground truth depth map from a ground truth depth map of the digital image.

12. The system of claim 11, wherein the at least one processor further causes the system to generate the compressed log ground truth depth map by:
converting the ground truth depth map to the disparity map utilizing an inverse function; and
generating a compressed log ground truth depth map from the disparity map based on the one or more distribution metrics.

13. The system of claim 12, wherein generating the compressed log ground truth depth map further comprises:
determining one or more distance distribution metrics from the disparity map; and
converting the disparity map to the compressed log ground truth depth map utilizing the one or more distance distribution metrics from the disparity map.

14. The system of claim 9, wherein the at least one processor further causes the system to generate the compressed log ground truth scene measurement map from the ground truth scene measurement map utilizing a logarithmic function based on a mean distance metric and deviation distance metric.

15. The system of claim 9, wherein the at least one processor further causes the system to generate the compressed log ground truth scene measurement map by scaling and shifting the ground truth scene measurement map based on a mean distance metric and deviation distance metric of the ground truth scene measurement map.

16. The system of claim 9, wherein the at least one processor further causes the system to generate the compressed log ground truth scene measurement map by:
determining a log base for a logarithmic function utilizing one or more scene measurement distribution metrics; and
generating the compressed log ground truth scene measurement map from the ground truth scene measurement map utilizing the logarithmic function with the log base.

17. The system of claim 9, wherein the at least one processor further causes the system to modify the parameters of the scene measurement prediction machine learning model by:
determining, a measure of loss by comparing the compressed log ground truth scene measurement map with the predicted scene measurement map via a loss function; and
modifying the parameters of the scene measurement prediction machine learning model based on the determined measure of loss.

18. A computer-implemented method comprising:
generating a predicted depth map for a digital image utilizing a depth prediction machine learning model;

generating a disparity map from a ground truth depth map of the digital image;

generating from the disparity map a compressed log ground truth depth map based on one or more distance distribution metrics of the ground truth depth map; and modifying parameters of the depth prediction machine learning model by comparing the predicted depth map and the compressed log ground truth depth map.

19. The computer-implemented method of claim 18, further comprising:

generating a compressed log depth map from an additional digital image utilizing the depth prediction machine learning model at inference time;

converting the compressed log depth map to a depth map utilizing an exponential function; and generating a modified digital image from the additional digital image utilizing the depth map.

20. The computer-implemented method of claim 1, further comprising:

converting the compressed log depth map to an additional disparity map utilizing the exponential function; and converting the additional disparity map to the depth map utilizing an inverse function, determining an exponent for the exponential function based on one or more distance distribution metrics of one or more digital images.

* * * * *